United States Patent Office 3,277,131
Patented Oct. 4, 1966

3,277,131
PREPARATION OF PURE ALKOXYTITANIUM IODIDES
Nikolaus Schön, Leverkusen, Josef Witte, Cologne-Stammheim, and Gottfried Pampus, Leverkusen, Germany, assignors to Farbenfabriken Bayer Aktiengesellschaft, Leverkusen, Germany, a German corporation
No Drawing. Filed Oct. 7, 1964, Ser. No. 402,323
Claims priority, application Germany, Nov. 8, 1963, F 41,233
4 Claims. (Cl. 260—429.5)

This invention relates to a process for preparing a pure alkoxytitanium iodide by reacting titanium tetraiodide with a titanium tetraalkylester.

It is known to prepare alkoxy titanium chlorides of the general formulae $Ti(OR)Cl_3$ and $Ti(OR)_2Cl_2$ by reacting titanium tetrachloride with an alcohol or with the corresponding titanium ester as such or in solution. The reaction takes place according to the following diagram:

$$TiCl_4 + RCH \rightarrow TiCl_3OR + HCl$$
$$3TiCl_4 + Ti(OR)_4 \rightarrow 4Ti(OR)Cl_3$$

These titanium esters containing chlorine have inter alia been found of interest for the production of temperature-resistant paints and also for the production of catalysts.

The aforesaid reactions can also be used for the production of titanium esters which contain iodine (alkoxy titanium iodides). If titanium tetraiodide is for example reacted with n-octanol in the molar ratio of 1:1 in benzene at 80° C. and if the reaction mixture is heated for 3 to 4 hours to boiling point until the splitting off of hydrogen iodide has ended, a solution is obtained which is deep brownish-red in colour, from which an oily substance solidifying at 15–20° C. can be isolated after evaporation of the solvent, the analysis values of said substance conforming to the formula $(C_8H_{17}O)TiI_3$.

The following compounds are obtained in similar manner the melting points thereof being between 15 and 25° C.:

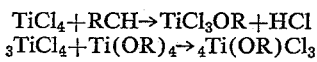

$(n-C_4H_9O)TiI_3$, $(n-C_4H_9O)_2TiI_2$, $(i-C_9H_{19}O)TiI_3$

All compounds have a blackish-brown colour.

By the reaction of alkoxy titanium triiodides and alkoxy titanium diiodides, or mixtures thereof, with organoaluminium compounds (aluminium trialkyls or aluminium alkylhydrides), catalysts are obtained which are excellently suitable for polymerising butadiene-1,3, with formation of more than 80% of 1,4-cis linkages.

The efficacy of the alkoxy titanium iodides as catalyst components is determined by the polymerisation velocity, by the yield and by the properties of the polymer (molecular weight, structure, etc.). It constitutes a very sensitive criterion for the purity and stability of the alkoxy titanium iodides.

If the polymerisation activity of the alkoxy titanium iodides which have been prepared by reacting titanium tetraiodide with alcohol is followed over a relatively long period, it is however found that the yields of polymer fall with increasing age of the compounds and the molecular weights of the butadiene polymers which are obtained increase because of a lowering of the concentration of active catalyst centres, i.e. the efficacy of the catalysts produced from these alkoxy titanium iodides decreases.

The instability of the alkoxy titanium iodides as prepared above is furthermore recognized from a change occurring with a lengthening period of time during storage in substance or in solution this change being characterized by the formation of a fraction insoluble in hydrocarbons and also sometimes by formation of free iodine.

It has now been found in accordance with the present invention that alkoxy titanium diiodides and triiodides with an improved degree of purity, high stability and constant catalytic efficacy are obtained if titanium tetraiodide is reacted with titanium tetralkyl esters in the molar ratio of 3:1 or 1:1, in an inert organic solvent, the reaction temperature being 30–80° C. and the reaction period being at most 150 minutes and advantageously between 15 and 120 minutes. After the reaction, the titanium alkoxy iodides can be isolated by evaporation of the solvent at temperatures below +80° C. or stored in the form of their solutions. To be considered as solvents are aliphatic, cycloaliphatic and aromatic hydrocarbons, which are free from H-acids and polar substances, e.g. pentane, hexane, cyclohexane, benzene and toluene. The reaction can also be carried out in solvents which contain halogen if the halogen atoms thereof show a small degree of mobility, as for example in chlorobenzene and trichloroethylene. The reaction of titanium tetraiodide with the titanium tetraalkyl esters is carried out with exclusion of oxygen and moisture under an inert atmosphere e.g. nitrogen, argon, etc.

It has proved to be advantageous to carry out the reaction of titanium tetraiodide with titanium tetraalkyl esters in 3–10 parts by weight of solvent, based on 1 part by weight of alkoxy titanium iodide. The solvent provides for a more rapid reaction of the titanium tetraiodide and for a better dissipation of the heat of reaction. When the reaction is carried out in substance, the mixing presents difficulties and in addition overheating can occur in the reaction mixture.

Esters of aliphatic or cycloaliphatic primary or secondary alcohols are used as titanium tetraalkyl esters, wherein the alkyl group has 1 to 16 carbon atoms, for example tetraethyl, tetraisopropyl, tetra-n-butyl, tetraisobutyl, tetra-n-hexyl, tetra-n-octyl, tetra-n-nonyl, tetraisononyl, tetra-n-undecyl, tetra-n-dodecyl, tetralauryl, tetra-n-cetyl, tetracyclopentyl and tetracyclohexyl titanates. In addition to the reaction temperature and reaction period, the conversion speed is also influenced by the grain size of the titanium tetraiodide used. It is recommended to use titanium tetraiodide of a grain size below 10 mm. and to provide for a thorough mixing during the conversion. It is advantageous to use titanium tetraiodide with a grain size of from 0.5 to 5 mm.

If the reaction of titanium tetraiodide with titanium tetraalkyl esters is carried out at temperatures below 30° C., the reaction period must be lengthened considerably. Furthermore, in this case, the reaction products which are obtained usually constitute mixtures of the initial, the intermediate and the final products, which are subject to secondary reactions. If these reaction products are reacted with organoaluminium compounds, catalysts having reduced and fluctuating catalytic efficacy are obtained.

If temperature ranges above 80° C. are chosen for the production of the alkoxy titanium iodides, there are observed the same effects which occur with the method of production from titanium tetra-iodide and alcohol. The alkoxy titanium iodides which are obtained have a lower degree of purity than the products obtained by the process according to the invention, the efficacy, of the catalysts produced therefrom on the one hand is lower and on the other hand decreases with lengthening period of storage of the titanium compounds. After the decomposition reaction

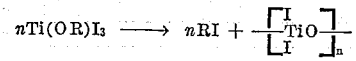

quickly taking place at 180–200° C., decomposition products are probably also formed to an increasing extent at relatively high reaction temperatures, these products causing the low stability of the alkoxy titanium iodides prepared in this way.

In the production of butoxy titanium triiodide, the reaction is followed by means of the specific band occurring in the infrared spectrum at 15.15μ. With a reaction temperature of 70° C. (toluene as solvent), it is appreciated that the maximum yield of butoxy titanium triiodide is reached after a reaction period of 30 minutes. With very long reaction times, the concentration of butoxy titaniumtriiodide gradually decreases again.

Under the reaction conditions according to the invention, there are obtained alkoxy titanium iodides which do not show the disadvantages which occur under reaction conditions which vary or with the production from titanium iodide and alcohol. The alkoxy titanium iodides produced according to the invention have an improved purity, which is also shown in the very high activity of the butadiene polymerisation catalysts produced therefrom. On storage under inert conditions at temperatures between 0 and +50° C., the titanium alkoxy iodides do not show any change also under the action of light over a period of several weeks. Furthermore, with the products produced according to the invention, there is found a melting point which is higher by 5–10° C. than that of the titanium alkoxy iodides produced by the process initially referred.

The high degree of purity and the high stability of the alkoxy titanium iodides obtainable by the present process enables them to be used on an industrial scale in the production of butadiene polymerisation catalysts. The constant activity necessary for a continuous industrial process renders possible the preparation of cis-1,4-polybutadiene with constant properties under conditions which can be reproduced.

Alkoxy titanium iodides of lower degree of purity with fluctuating or decreasing activity would produce interruptions in a continuous process and lead to products of which the quality varies.

The following examples serve to illustrate specific embodiments of the process of the present invention. The term "parts" given in the examples means "parts by weight."

*Example 1.—Titanium-n-butoxy triiodide*

With exclusion of moisture and oxygen, 55.55 parts of titanium tetraiodide (grain size below 3 mm.) were suspended in 500 parts of dry toluene. After adding 11.35 parts of titanium tetra-n-butyl ester, the mixture was heated while stirring and within 3 to 5 minutes to 70° C. Samples were taken at varying intervals of time, quickly cooled and examined in the infra-red spectrum. If the toluene bands are compensated for, the band occurring at 10.15μ, which is specific for $Ti(OC_4H_9)I_3$, can be used for the quantitative determination. If the maximum absorption found is considered equal to 100, then the following relation is obtained between reaction period and degree of conversion:

| Reaction period (minutes) | 8 | 15 | 30 | 60 | 120 | 240 |
|---|---|---|---|---|---|---|
| Conversion (percent) | 70 | 95 | 100 | 100 | 99 | 96 |

A sample with the reaction period of 30 minutes was concentrated by evaporation at 25–30° C. A blackish-brown substance was left, this having a softening point of 20–25° C.

Analysis (the values calculated for $Ti(OC_4H_9)I_3$ are given in brackets):

Titanium _____ 9.4 (9.55)
C _____ 9.5 (9.57)
Iodine _____ 75.65 (75.88)

The titanium butoxy triiodide obtained was tested for its catalytic efficacy in he polymerisation of butadiene-1,3, the following samples of butoxy titanium triiodide being used for the production of polymerisation catalysts:

Sample (a)—10% by weight of $(C_4H_9O)TiI_3$ in toluene, reaction period 30 minutes.
Sample (b)—As sample (a), stored for 20 days at 40° C. (sealed vessel).
Sample (c)—As sample (a), stored for 40 days at 40° C. (the solution showed no formation of precipitate).

Using a stirrer-type vessel and in each case 1000 parts of dry toluene (water content 5–7 p.p.m.) with exclusion of air and moisture, the catalyst solution was produced by adding the butoxy titanium triiodide solution and a 25% by weight solution of aluminium triisobutyl in toluene at 20° C. while stirring. The molar ratios were 0.7 millimol of butoxytitanium triiodide and 2.8 millimol of aluminium triisobutyl per 100 g. of butadiene-1,3. 100 parts of butadiene were introduced into the blackish-brown catalyst solution and the polymerisation started immediately. The temperature was regulated that 40° C. in the solution were not exceeded. After 3 hours, the polymerisation was stopped by adding 1 part of 2,6-di-tert.-butyl-4-methylphenol. The polymer solutions were worked up by introduction into water at 95–98° C. The forming rubber crumbs were dried in vacuo at 50° C.

| | Polymer yield, percent | IR-Spectrum 1,4-cis-content, percent | Mooney-viscosity (ML 4' 100° C.) |
|---|---|---|---|
| Sample (a) | 100 | 91.2 | 40 |
| Sample (b) | 98 | 90.5 | 39 |
| Sample (c) | 100 | 91.4 | 41 |

If for comparison purposes the reaction of titanium tetraiodide with titanium tetra-n-butyl ester is carried out at a temperature of 110° C. with a reaction period of 150 minutes (sample (d)), a yield of 91% of butoxy titanium triiodide is found from the infra-red spectrum. A part of the solution was stored for 15 days at 40° C. (sample (e)). Polymerisation tests as indicated above provided the following results:

| | Polymer Yield | Mooney-Viscosity |
|---|---|---|
| Sample (d) | 100 | 46 |
| Sample (e) | 98 | 55 |

For comparison purposes, butoxy titanium triiodide was prepared by reacting titanium tetraiodide with n-butanol:

55.5 parts of titanium tetraiodide were suspended in 600 parts of benzene and then 7.41 parts of n-butanol were added dropwise, evolution of hydrogen iodide then starting. The reaction mixture was heated for 4 hours to boiling point. Towards the end of the heating period, the evolution of hydrogen iodide has finished.

A part of the solution was concentrated by evaporation at 30° C. The blackish-brown and partly crystalline residue had a softening point of 15–20° C. Analysis provided the following values:

Titanium _____ 9.72 (9.55)
C _____ 9.28 (9.57)
H _____ 1.65 (1.8)
Iodine _____ 75.1 (75.88)

A part of the butoxy titanium triiodide solution as obtained was stored for 5 days at 40° C. (sample (g)) and another part for 15 days at 40° C. (sample (h)). With sample (h), a small quantity of precipitate, 0.85% by weight, based on $(C_4H_9O)TiI_3$, had been formed by comparison with the initial solution (sample (f)), the following values were obtained in the polymerisation:

|  | Polymer yield | IR-Spectrum Cis-content | Mooney-viscosity (ML 4' 100° C.) |
|---|---|---|---|
| Sample (f) | 100 | 89.5 | 45 |
| Sample (g) | 98 |  | 51 |
| Sample (h) | 90 | 89.0 | 59 |

Example 2.—n-Octoxy titanium triiodide

In a manner similar to that used in Example 1, a solution of octoxy titanium triiodide was prepared from 55.5 parts of titanium tetraiodide and 18.82 parts of titanium tetra-n-octyl ester during a reaction period of 30 minutes. A part of the solution was stored for 30 days at 40° C. If polymerisation reactions are carried out with both solutions, as in Example 1, in both cases the yields are 98–100% and the molecular weights of the butadiene polymers obtained, expressed by the Mooney viscosity (ML 4' 100° C.), were 40 and 41, respectively. Precipitate formation was not observed.

Example 3.—n-Butoxy titanium triiodide

With exclusion of oxygen and moisture, 55.55 parts of titanium tetraiodide were suspended in 700 parts of dry cyclohexane, 11.35 parts of titanium tetra-n-butyl ester were added and the mixture heated while stirring for 60 minutes to 60° C. A part of the solution was concentrated by evaporation; the butoxy titanium triiodide obtained showed a softening point of 22–26° C.

*Analysis.*—Titanium 9.42 (calculated 9.55). Iodine 75.60 (calculated 75.88).

The catalytic efficacy of the butoxy titanium triiodide solution was tested as in Example 1:
Yield of polybutadiene: 100%.
Mooney viscosity (ML 4' 100° C.) 41.
A part of the solution was stored for 50 days at 20–30° C. and tested as in Example 1:
Yield of polybutadiene: 98%.
Mooney viscosity (ML 4' 100° C.) 39.

What we claim is:

1. Process for preparing a pure alkoxy titanium triiodide which comprises reacting titanium tetraiodide with titanium tetraalkyl ester in a mole ratio of 3:1, in the presence of an inert organic solvent, at a temperature of substantially between about +30 and +80° C. for a reaction time of at most 150 minutes.

2. Process according to claim 1, wherein said titanium tetraiodide has a grain size of from 0.5 to 5 mm.

3. Process according to claim 1, wherein said inert organic solvent is toluene.

4. Process for preparing a pure alkoxy titanium triiodide which comprises reacting titanium tetraiodide with a titanium tetraalkyl ester in a mole ratio of 3:1, in the presence of a liquid hydrocarbon, under an inert atmosphere at a temperature of between +30° to 80° C. for a reaction time of at most 150 minutes, the weight ratio of liquid hydrocarbon to the titanium tetraiodide being in the range of 3:1 to 10:1 and such titanium tetraiodide having a grain size below 10 mm.

References Cited by the Examiner
UNITED STATES PATENTS
2,898,355   8/1959   Herman et al. _____ 260—429.5

TOBIAS E. LEVOW, *Primary Examiner.*

H. M. S. SNEED, *Examiner.*

UNITED STATES PATENT OFFICE
CERTIFICATE OF CORRECTION

Patent No. 3,277,131

October 4, 1966

Nikolaus Schön et al.

It is hereby certified that error appears in the above numbered patent requiring correction and that the said Letters Patent should read as corrected below.

Column 3, line 5, for "15.15/u" read -- 10.15/u --; line 75, for "in he" read -- in the --;

Signed and sealed this 29th day of August 1967.

(SEAL)
Attest:

ERNEST W. SWIDER
Attesting Officer

EDWARD J. BRENNER
Commissioner of Patents